(12) United States Patent
Woodall et al.

(10) Patent No.: US 6,420,803 B1
(45) Date of Patent: Jul. 16, 2002

(54) SYSTEM FOR IMPROVING VEHICLE SAFETY IN CRASH SITUATIONS

(75) Inventors: Robert Woodall, Lynn Haven; Felipe Garcia, Panama City, both of FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/533,635

(22) Filed: Mar. 22, 2000

(51) Int. Cl.[7] .................................................. B60R 21/02
(52) U.S. Cl. .......................... 307/121; 180/282; 701/45
(58) Field of Search .................................. 180/271, 274, 180/282; 307/9.1, 10.1, 112, 121; 701/45

(56) References Cited

U.S. PATENT DOCUMENTS

| | | | | |
|---|---|---|---|---|
| 4,381,829 A | * | 5/1983 | Montaron | 180/274 |
| 4,655,475 A | * | 4/1987 | Van Gelderen | 280/777 |
| 4,984,464 A | * | 1/1991 | Thomas et al. | 180/282 |
| 5,389,824 A | * | 2/1995 | Moroto et al. | 307/10.1 |
| 5,825,098 A | * | 10/1998 | Darby et al. | 701/45 |
| 6,157,880 A | * | 12/2000 | de Mersseman et al. | 307/9.1 |
| 6,278,924 B1 | * | 8/2001 | Gioutsos et al. | 307/10.1 |

* cited by examiner

*Primary Examiner*—Jeffrey Sterrett
(74) *Attorney, Agent, or Firm*—Harvey A. Gilbert; Donald G. Peck

(57) ABSTRACT

A system and method are provided for improving vehicle safety in a crash situation for a vehicle having mountable vehicle components. A plurality of pyrotechnic bolts are used to mechanically couple at least a portion of the vehicle components to the vehicle. A force measuring device measures forces experienced by the vehicle during a crash and produces a signal indicative thereof. This signal is compared with a threshold. An activation signal is generated when the threshold is attained. Failure of the pyrotechnic bolts is then initiated in accordance with a prescribed plan.

16 Claims, 2 Drawing Sheets

SYSTEM FOR IMPROVING VEHICLE SAFETY IN CRASH SITUATIONS

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to safety systems for motor vehicles, and more particularly to a system and method for improving motor vehicle safety in crash situations by assuring the timely and reliable failure of various mounts (e.g., motor mounts, transmission mounts, axle mounts, etc.) in order to help dissipate kinetic energy during the crash and reduce the shock and deceleration forces acting on the passenger compartment and, ultimately, the vehicle's passengers.

BACKGROUND OF THE INVENTION

Given today's extensive use of motor vehicles, a significant risk exists that a vehicle may crash into objects or other vehicles. The most severe crashes are those in which a vehicle strikes an object and the front of the vehicle crushes rearward toward the passenger compartment. If the crash is severe enough, the engine can be pushed back into the passenger compartment. Significant penetration into or deformation of the passenger compartment can lead to injury or death of the occupant(s). The risk of impact injury to the occupants of military vehicles is even more significant because soldiers do not usually use seat restraints so as not to restrict their movement in time of crisis.

During the high dynamic-loading experienced during a vehicular collision, the passengers of the vehicle are exposed to acceleration forces due to the sudden change of speed of the vehicle. Upon impact, the passengers experience deceleration forces that can be substantially minimized if they are spread over a longer period of time.

Regardless of the kinetic energy present, the sum of the forces acting on the individual components in a system of masses is equal to the sum of the individual masses times their acceleration. Acceleration can be expressed as the change in velocity of a mass over a given amount of time. Passengers inside a moving vehicle along with the moving vehicle can all be seen as individual moving masses in a system of masses. To reduce the deceleration peak forces upon each passenger, it is desirable to create a situation where the time provided for the masses to slow is maximized. Towards this end, the deployment of air bags increases the time that a passenger will experience deceleration.

In addition to air bag restraint systems, a variety of mechanical means are also used to slow the rate of passenger compartment deceleration during impact. In general, these mechanical means allow the forward and rearward portions of a car to absorb energy by crumpling. For example, crumpling of various structural members allows significant bits of time to lapse before the passenger compartment comes to a full stop. This results in deceleration forces being reduced during the slowing of the passenger compartment. While the crumple zones are collapsing, they slow the passenger compartment. Thus, when the vehicle's rigid safety cage finally comes to a complete stop, the jolt is less severe than if the vehicle was completely rigid and came to an abrupt stop from full speed at impact in a minimal amount of time.

Other mechanical means have been developed to help mitigate the intrusion of the motor/transmission/axle into the passenger compartment during impact. These methods involve mechanical deformation followed by mechanical breakage of bolted or welded metallic mount assemblies. After a severe impact, the motor mounts fail and the engine pivots or falls down allowing more room for the front crumple zone to absorb impact kinetic energy prior to the engine impinging upon the passenger compartment. However, proper failure of mechanical mount assemblies is not always assured or take place in a timely fashion.

Current methods use the mechanical impact forces to deform and then break bolted or welded metallic mount assemblies. Due to the number of mechanical parts needed to fabricate these assemblies and the unpredictability of the impact force vector, these structural members do not work as desired in many instances. That is, the motor/transmission/axle can release at unpredictable times during the accident. For example, if the forward motor mounts or mechanical linkages used to pivot the motor are deformed but do not allow the motor to pivot downward reliably, the motor might impinge upon the passenger compartment after only minimal crunching of the crumple zone. This could result in unnecessary forces being imparted to the occupants and could increase the chance that the motor will deform and/or penetrate into the passenger compartment.

SUMMARY OF THE INVENTION

Accordingly, it is an object of the present invention to provide a method and system for improving vehicle safety in a crash situation.

Another object of the present invention is to provide a method and system for dissipating kinetic energy generated during a vehicle crash situation in a predictable fashion.

Yet another object of the present invention is to provide a method and system for the "on command" decoupling of various vehicle components from a vehicle safety cage/frame in a crash situation.

Still another object of the present invention is to provide a method and system for assuring the timely and reliable failure of various vehicle mounting assemblies in a crash situation in order to mitigate intrusion of vehicle components into the passenger compartment.

Other objects and advantages of the present invention will become more obvious hereinafter in the specification and drawings.

In accordance with the present invention, a system and method are provided for improving vehicle safety in a crash situation for a vehicle having mountable vehicle components. A plurality of pyrotechnic bolts are used to mechanically couple at least a portion of the vehicle components to the vehicle. A force measuring device coupled to the vehicle measures forces experienced by the vehicle during a crash and produces a signal indicative of these forces. The signal indicative of crash forces is compared with a threshold and an activation signal is generated when the threshold is attained. Failure of the pyrotechnic bolts is initiated in accordance with a prescribed plan when the activation signal is generated. Failure control of the pyrotechnic bolts can be "piggy-backed" on a vehicle's existing air bag restraint control system. A variety of methods/systems can be used to implement the prescribed plan of bolt failure. Additional safety enhancements can include the use of pyrotechnic pushers to apply forces to vehicle components released by the pyrotechnic bolt failures. Further, energy dissipators can be used to absorb shock while rigid deflectors can be strategically mounted to protect the vehicle passenger compartment and, possibly, change the angular movement of the passenger compartment relative to the axis of crash impact.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
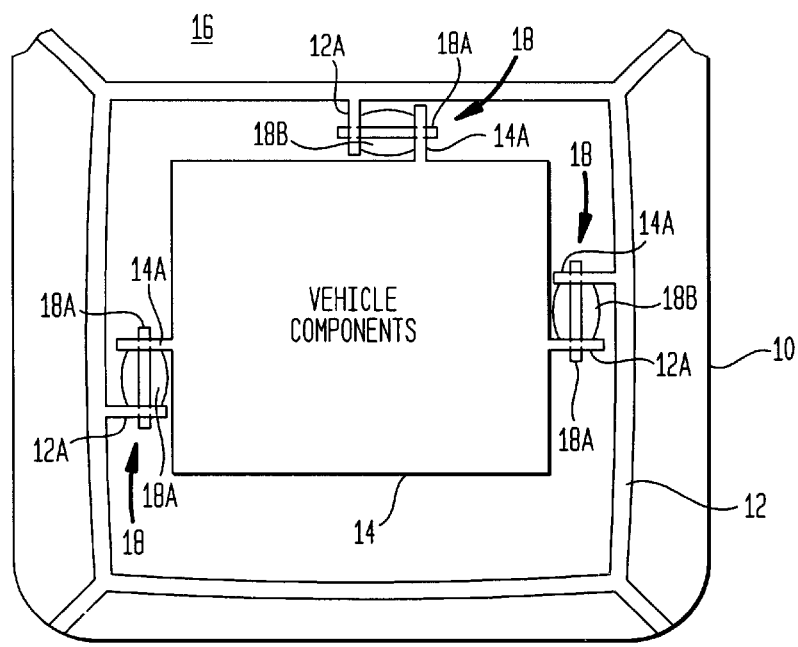
FIG. 1 is a schematic top-view of the front end of a conventional vehicle in which mechanical mounting assemblies are used to support the vehicle's motor and other components from the vehicle's frame.

Referring now to the drawings, and more particularly to FIG. 1, the front end 10 of a conventional vehicle is shown. Front end 10 has a safety cage or frame 12 from which a variety of vehicle components 14 are mounted. The present invention will generally be concerned with the most massive ones of vehicle components 14, e.g., motor, transmission and axle assemblies. However, it is to be understood that the present invention could also be used in conjunction with other vehicle components such as the compressor, alternator, battery, etc. Each of vehicle components 14 is typically mechanically coupled to frame 12 by one or more mounting assemblies, each of which is referenced generally by numeral 18. Each of mounting assemblies 18 typically includes a vehicle component bracket 14A coupled to a portion of a particular vehicle component, a frame bracket 12A coupled to a portion of frame 12, a mechanical fastener 18A (e.g., bolt, rivet, etc.) mechanically coupling brackets 12A and 14A, and a bushing 18B between brackets 12A and 14A.

Figure 2:
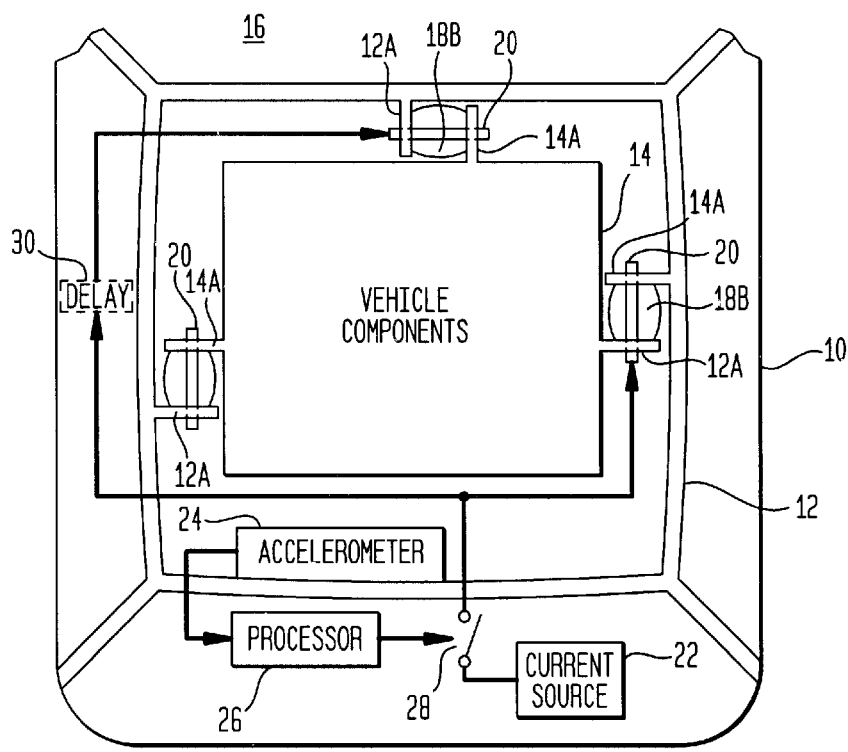
FIG. 2 is a schematic top-view of the front-end of the vehicle equipped with one embodiment of a system for improving vehicle safety in accordance with the present invention.

In the present invention, vehicle safety is greatly improved by the inclusion of the system components illustrated by way of example in FIG. 2, where like reference numerals are used for those elements that are common with the conventional configuration illustrated in FIG. 1. Selected ones or all of mechanical fasteners 18A (FIG. 1) are replaced in the present invention by pyrotechnic bolts 20. A variety of such bolts are known in the art. For example, U.S. Pat. No. 5,997,230 discloses a pyrotechnic bolt that is available commercially from Cartridge Actuated Devices Inc., Fairfield, N.J. Generally speaking, pyrotechnic bolts are designed to fail (e.g., explode, expand, fracture, etc.) when some form of initiation energy (e.g., electric current) is supplied thereto.

For the illustrated embodiment, the initiation energy is supplied to pyrotechnic bolts 20 from a current source 22 which could be the vehicle's battery or an independent current source. Current source 22 supplies current to pyrotechnic bolts 20 in the event of a crash. One embodiment of a system for determining the appropriate time/situation for coupling current source 22 includes an accelerometer 24, a processor 26 coupled to accelerometer 24, and a switch 28 coupled to processor 26 and coupled between current source 22 and pyrotechnic bolts 20. Accelerometer 24 is typically attached to vehicle 10 somewhere on frame 12 in order to sense dynamic impact forces experienced by vehicle 10 in a crash situation. A signal indicative of the impact forces is supplied to processor 26 which is programmed to compare the output from accelerometer 24 with a threshold value indicative of a severe crash situation. Processor 26 can be a microprocessor or a simple logic device capable of carrying out a comparison and generating a logical result to control closure of switch 28. Once the threshold is attained, processor 26 outputs a signal (e.g., a logical "high" or "1") to switch 28 which closes in response thereto to couple current source 22 to pyrotechnic bolts 20 to initiate their failure.

The failure of pyrotechnic bolts 20 in a crash situation can be carried out in accordance with a predetermined or prescribed plan of failure. That is, each particular type of vehicle may have a preferred sequence of bolt failure. For example, referring again to FIG. 2, the mounting assembly nearest passenger compartment 16 could be designed to pivot once all the other mounting assemblies (coupled to that particular one of vehicle components 14) failed. If this is the case, it may be desirable to delay the failure of the pyrotechnic bolt 20 used in the pivoting mounting assembly. One way to accomplish this is to couple a (pyrotechnic) delay 30 in line between switch 28 and the appropriate one(s) of pyrotechnic bolts 20. Since the use of delay 30 is not a requirement of the present invention, it is illustrated in dashed-line form. Another way to carry out a prescribed sequencing plan is to use multiple switches (like switch 28) and then controlling the switches with independent control signals from processor 28. Accordingly, the particular sequencing plan and method/system used for carrying out same can vary and is not a limitation of the present invention.

When the present invention is included as part of a vehicle that is equipped with an airbag restraint system, some or all of the function provided by accelerometer 24, processor 26, switch 28 and current source 22 could be "piggy-backed" off the control system used for the airbag restraint system. In such instances, the cost and complexity associated with implementing the present invention is greatly reduced.

Figure 3:
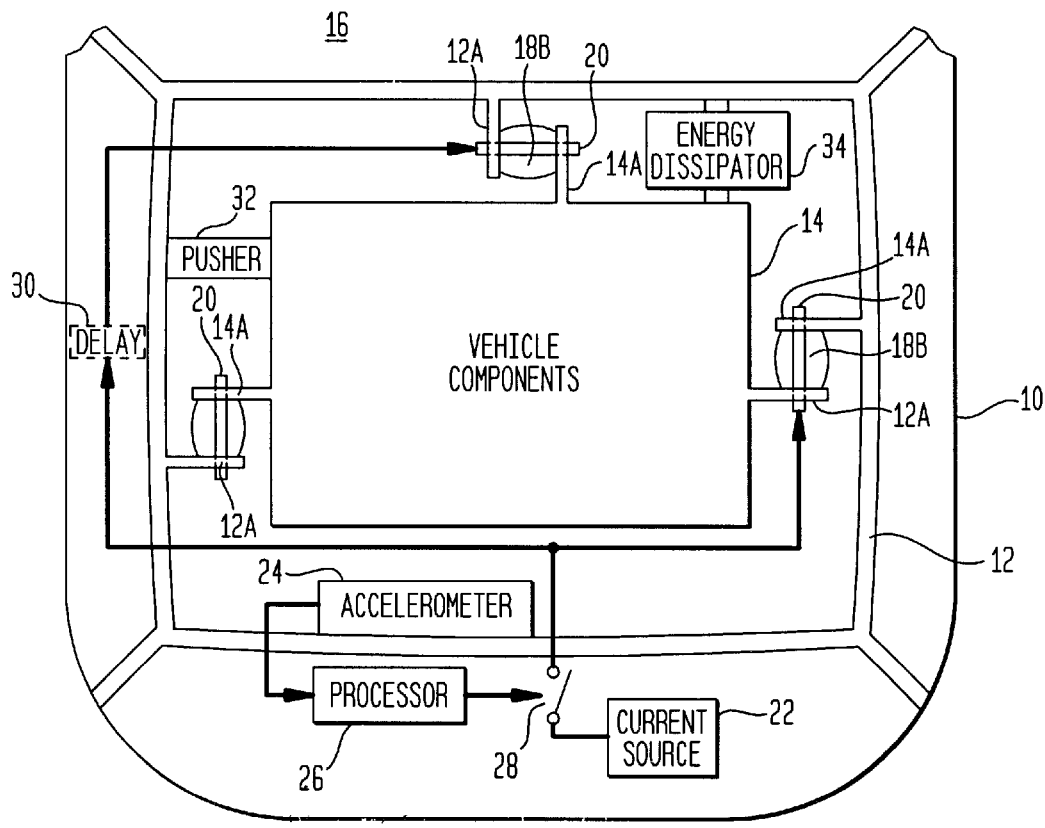
FIG. 3 is a schematic top-view of the front-end of the vehicle equipped with additional safety features in accordance with the present invention.

The safety improvements provided by the present invention can be further enhanced in one or more of the following ways. For example, as illustrated in FIG. 3, one (or more) activatable pushing devices 32 (e.g., pyrotechnic pushers available commercially from Roberts Research Laboratory, Torrence, Calif.) can be coupled between vehicle 10 (e.g., frame 12) and vehicle components 14 at selected position(s). Pushing devices 32 can be coupled to switch 28 to receive activation energy at the same time as (or slightly delayed with respect to) pyrotechnic bolts 20. Once activated, pushing devices 32 apply a pushing force to deflect vehicle components 14 away from, for example, passenger compartment 16. Another safety enhancement involves the selective use and placement of one or more energy dissipator (s) 34 coupled between, for example, frame 12 and vehicle components 14. Energy dissipators 34 could be any mechanically, hydraulically or electrically-based shock dampening devices well known in the art. Their function would be to absorb the momentum of vehicle components 14 in a crash situation.

Figure 4:
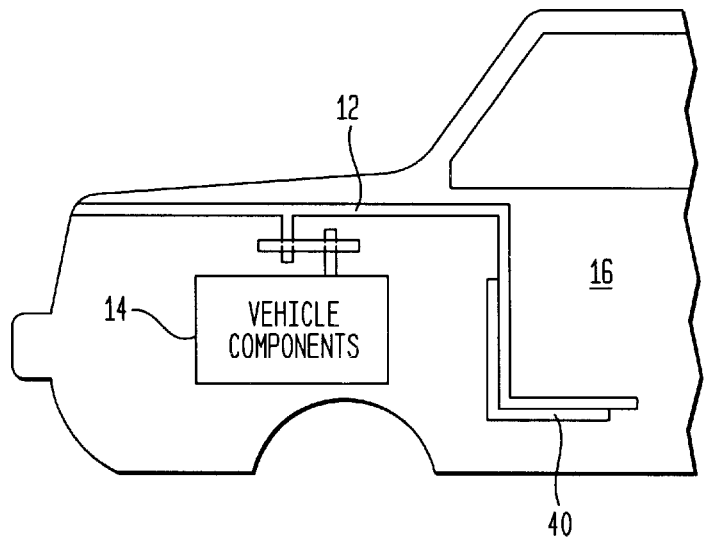
FIG. 4 is a schematic side-view of the front-end of the vehicle equipped with a rigid deflector to further enhance vehicle'safety in a crash situation.

Another safety enhancement in the present invention involves the use of rigid deflectors strategically placed between some or all of vehicle components 14 and passenger compartment 16. For example, as illustrated in FIG. 4, a rigid deflector 40 can be attached to frame 12. In a crash situation, vehicle components 14 would be released from their mounting assemblies by the failure of pyrotechnic bolts 20 as described above. As vehicle 10 continued to move forward, vehicle components 14 contact rigid deflector 40 which, in turn, would cause vehicle 10 to ride up onto vehicle components 14. In this way, passenger compartment 16 moves angularly relative to the axis of crash impact which reduces forward deceleration forces acting on passenger compartment 16.

The advantages of the present invention are numerous. A system and method are provided that can improve the safety of a vehicle in a crash situation. The use of pyrotechnic bolts in the various vehicle mounting assemblies provides a reliable system and method of bringing about mounting assembly failure when desired. The ability to predictably and reliably cause the most massive vehicle components to release from the vehicle's frame in a crash situation will greatly dissipate their kinetic energy and thereby reduce the deceleration forces on the vehicle's passenger compartment. The sequence of bolt failure is easily adapted for any type of vehicle. Further, the system and method can be easily incorporated into existing vehicle designs and can take advantage of existing control systems on vehicles equipped with airbag restraint systems. Since lightweight pyrotechnic bolts replace the heavy mechanical linkages used to release automotive elements in the previous area, there will be a reduction in vehicle weight which ultimately reduces the kinetic energy present in a crash situation for a given speed of the vehicle. The reduction in overall vehicle weight will also contribute to improved gas mileage for the vehicle.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. For a vehicle having mountable vehicle components, a system for improving vehicle safety in a crash situation, comprising:

a plurality of pyrotechnic bolts for mechanically coupling at least a portion of the vehicle components to the vehicle;

first means coupled to the vehicle for measuring forces experienced by the vehicle during a crash and for producing a signal indicative of said forces;

second means coupled to said first means for comparing said signal with a threshold wherein an activation signal is generated by said second means when said threshold is attained; and third means coupled to said second means and to said plurality of pyrotechnic bolts for initiating failure of said plurality of pyrotechnic bolts in accordance with a prescribed sequencing plan when said activation signal is generated, wherein said prescribed sequencing plan dictates an order in which failure of said plurality of pyrotechnic bolts is to occur.

2. A system as in claim 1 wherein said first means comprises at least one accelerometer.

3. A system as in claim 1 wherein said second means comprises a logic device wherein said activation signal is indicative of a logical "1".

4. A system as in claim 1 further comprising a plurality of shock dampening elements coupled mechanically at selected positions between the vehicle and the vehicle components.

5. A system as in claim 1 wherein said third means includes delay means coupled to at least one of said plurality of pyrotechnic bolts for delaying failure initiation thereof in accordance with said prescribed sequencing plan.

6. A system as in claim 5 wherein said delay means is coupled in line with said at least one of said plurality of pyrotechnic bolts.

7. A system as in claim 1 further comprising at least one rigid deflector mounted to the vehicle between at least one of the vehicle components and a passenger compartment of the vehicle.

8. A system as in claim 1 further comprising a plurality of pyrotechnic pushers coupled mechanically at selected positions between the vehicle and the vehicle components, and coupled electrically to said third means, said plurality of pyrotechnic pushers initiated by said third means to apply a pushing force to the vehicle components at said selected positions when said activation signal is generated.

9. A method of improving vehicle safety in a crash situation, comprising the steps of:

providing a vehicle having vehicle components supported from a frame of the vehicle by mounting assemblies that use mechanical fasteners to mechanically couple the vehicle components to the mounting assemblies;

replacing at least a portion of the mechanical fasteners with pyrotechnic bolts;

measuring forces experienced by the vehicle in a crash situation;

converting said forces to a signal indicative thereof;

comparing said signal with a threshold wherein an activation signal is generated when said threshold is attained; and supplying failure initiation energy to said pyrotechnic bolts in accordance with a prescribed sequencing plan when said activation signal is generated, wherein said prescribed sequencing plan dictates an order in which failure of said plurality of pyrotechnic bolts is to occur.

10. A method according to claim 9 wherein the vehicle is equipped with an airbag restraint system, and wherein said steps of measuring, converting, comparing and supplying are accomplished using the airbag restraint system.

11. A method according to claim 9 wherein said step of supplying includes the step of delaying receipt of said failure initiation energy by selected ones of said plurality of pyrotechnic bolts in accordance with said prescribed sequencing plan.

12. A method according to claim 9 further comprising the step of applying pushing forces to the vehicle components at selected positions when said activation signal is generated.

13. For a vehicle having mountable vehicle components, a system for improving vehicle safety in a crash situation, comprising:

a plurality of pyrotechnic bolts for mechanically coupling at least a portion of the vehicle components to the vehicle;

at least one accelerometer coupled to the vehicle for measuring forces experienced by the vehicle during a crash and for producing a signal indicative of said forces;

a processor coupled to said accelerometer for comparing said signal with a threshold wherein an activation signal is generated by said processor when said threshold is attained;

a source of electrical current;

a switch coupled to said processor and between said source and said plurality of pyrotechnic bolts, wherein said switch closes only when said switch is supplied with said activation signal; and delay means coupled between at least one of said plurality of pyrotechnic bolts and said switch wherein, when said switch is closed, said source is connected to said plurality of pyrotechnic bolts directly or through said delay means so that failure of said plurality of pyrotechnic bolts is initiated in accordance with a prescribed sequencing plan, wherein said prescribed sequencing plan dictates an order in which failure of said plurality of pyrotechnic bolts is to occur.

14. A system as in claim 13 further comprising a plurality of pyrotechnic pushers coupled mechanically at selected positions between the vehicle and the vehicle components, and coupled electrically to said switch, wherein said plurality of pyrotechnic pushers are initiated by said electrical current when said switch is closed whereby said plurality of pyrotechnic pushers apply a pushing force to the vehicle components at said selected positions.

15. A system as in claim 13 further comprising a plurality of shock dampening elements coupled mechanically at selected positions between the vehicle and the vehicle components.

16. A system as in claim 13 further comprising at least one rigid deflector mounted to the vehicle between at least one of the vehicle components and a passenger compartment of the vehicle.

* * * * *